May 16, 1950     R. B. DE LANO, JR     2,507,854
MEANS FOR INSPECTING MATERIALS BY WAVE TRAINS
Filed Dec. 19, 1945
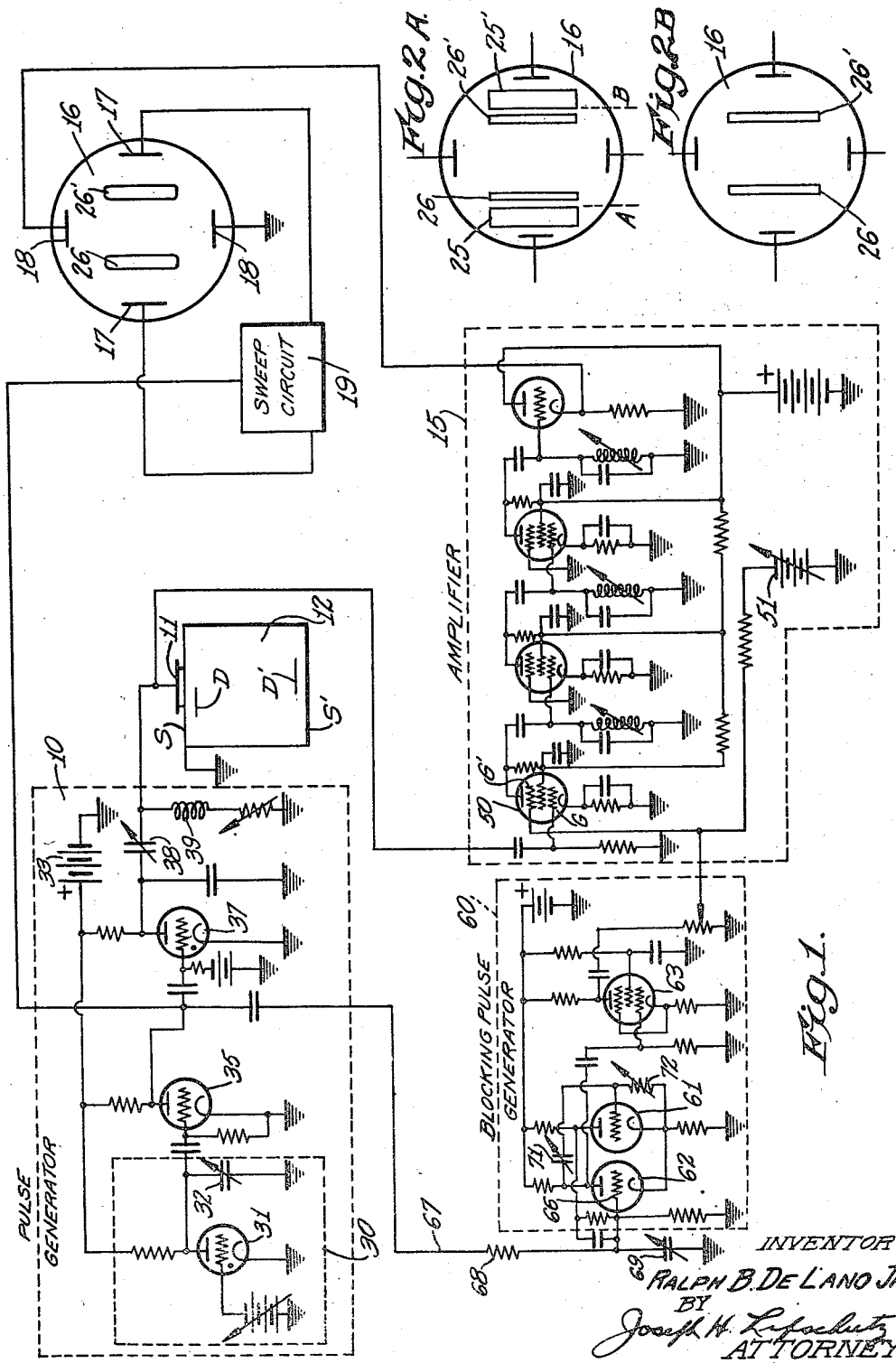
INVENTOR
RALPH B. DE LANO JR
BY
Joseph H. Lifschutz
ATTORNEY

UNITED STATES PATENT OFFICE 2,507,854

MEANS FOR INSPECTING MATERIALS BY WAVE TRAINS

Ralph B. De Lano, Jr., New York, N. Y., assignor to Sperry Products, Inc., Hoboken, N. J., a corporation of New York Application December 19, 1945, Serial No. 636,030

3 Claims. (Cl. 73—67)

This invention relates to a means for testing materials by means of wave trains of radio, supersonic or other high frequency signals. One such means for testing is disclosed in the patent to F. A. Firestone, No. 2,280,226, granted April 21, 1942, which discloses apparatus for sending wave trains into an article under test and measuring the time interval which elapses between the sending of the signal and receiving of the reflection from defects within the article. The transmitted pulse may be applied to the article by a piezo-electric crystal and the reflected pulse may be received either by the same crystal or another crystal, and the output of the crystal may be impressed on the input of a receiver amplifier. It is apparent that the amplifier will receive the transmitted pulse as well as the reflected pulse if the amplifier remains operative at all times, and if a reflecting surface, such as a defect, lies close enough to the entering surface of the article under test or close enough to the opposite bounding surface of the article, reflections from the defect will in many instances be merged with the pulse and with the reflection of the pulse from the rear bounding surface. Under these circumstances it becomes difficult or almost impossible to distinguish such defect from the pulse and its reflection from the bounding surface since the indications due to the pulse and the last-named reflection normally vary in magnitude to a certian degree and, therefore, such variations as may be introduced by reflections from a defect are indistinguishable.

It is one of the principal objects of this invention to provide a means for clearly indicating the presence of defects within an article, including those defects which lie near the entering and rear surfaces of the article.

It is a further object of this invention to provide a means for testing an article by wave trains wherein the reflections of the wave trains caused by defects within the article will be clearly differentiated from the pulse itself and from the reflection of the pulse from the bounding surface opposite the entering surface.

It is a further object of this invention to provide an indicating means in a testing device as described wherein a defect is distinguished from the pulse and from its reflection from the rear bounding surface by eliminating indications due to the pulse and said reflection. One of the major advantages flowing from such arrangement resides in the fact that it permits the use of a meter as the indicating instrument since only the defect signal will be registered. The use of a meter is impossible where either the generated pulse or its reflection from the rear bounding surface is received, since obviously these signals will actuate the meter in the same manner as a defect and will be indistinguishable therefrom.

It is a further object of this invention to provide a receiver amplifier for receiving the wave trains, in combination with means for blocking the amplifier against receiving such wave trains until the end of the transmitted pulse.

It is a further object of this invention to provide a receiver amplifier for receiving wave trains, in combination with means for blocking the amplifier against receiving further wave trains just before the reflection of the transmitted pulse from the bounding surface opposite to the entering surface is received.

It is a further object of this invention to provide a receiver amplifier for the wave trains, in combination with means for blocking said amplifier from the time just before the reflection of the pulse from the rear surface is received until the end of the transmission of the succeeding pulse.

Further objects and advantages of this invention will become apparent in the following detailed description thereof.

In the accompanying drawings,

Fig. 1 is a wiring diagram illustrating one embodiment of my invention.

Figs. 2A and 2B are diagrammatic illustrations of an oscilloscope having indications thereon illustrating the principle of this invention.

Reference to Fig. 1 discloses my invention applied to a supersonic testing device wherein wave trains or pulses are periodically generated by a suitable pulse generator 10. Each pulse or wave train as it is generated is impressed upon a crystal 11 which is in engagement with a work piece 12 which it is desired to test for defects. The pulse will cause the crystal 11 to oscillate and send a train of mechanical vibrations through the work piece 12 from the front or entering surface S through the block to the opposite or rear surface S'. At the same time that the pulse is impressed on the crystal 11 it is also impressed on an amplifier 15 whose output may actuate any suitable indicator. As shown in the drawings, the indicator may be an oscilloscope 16 having horizontal plates 17 across which a sweep is impressed by any conventional sweep circuit 19, and vertical plates 18 on which the output of the amplifier 15 is impressed.

As the pulse travels through the work piece 12 and strikes the surface S' it is reflected back to the crystal 11 where the mechanical vibrations generate voltages which are impressed on the amplifier. The generated pulse on the crystal 11 also is impressed on the amplifier, so that normally if the amplifier were continuously effective there would be two indications on the oscilloscope, 25 and 25', corresponding to the transmitted pulse and to the reflection of the transmitted pulse from the surface S'. The distance between 25 and 25' is a measurement of time which the pulse consumed in travelling through the work piece and back to the crystal, and is therefore also a measurement of distance since it corresponds to twice the depth of the work piece. Should the pulse strike an intermediate reflecting surface such as fissure D or D' some of the pulse will be reflected by this surface back to the crystal before the pulse has been reflected from the surface S'. This will become evident by an indication 26 or 26' on the oscilloscope. The distance of 26 or 26' from the beginning of pulse 25 is a function of the depth of the defect below the entering surface S.

Since the pulse requires a certain time in transmission as indicated by the width of the pulse mark 25, it becomes apparent that if a defect such as D lies close enough to the entering surface S it will start to reflect the pulse before the transmission of the pulse has terminated. Similarly, if a defect such as D' lies close to the rear reflecting surface S' the reflections from D' will not have ceased before the reflections from S' commence. Therefore it frequently happens in practice that there is a merging of indications corresponding to 25 and 26 and to 25' and 26' which makes it difficult and sometimes impossible to distinguish defects which lie close to the entering and rear bounding surfaces of the article.

The problem which has been presented above is herein solved in the following manner. I provide means for rendering the receiver ineffective until the generation of the transmitted pulse 25 has ended. Thereupon the receiver is rendered effective and remains effective until just before the reflection of the transmitted pulse from the rear bounding surface S' has reached the crystal 11. At this point I render the receiver again ineffective in which condition it remains until the end of the succeeding generated pulse. In other words, as indicated diagrammatically the receiver is effective from A to B but is ineffective from B to A.

In Fig. 1 I have disclosed the details of a system capable of performing these functions. As here shown, the pulse generator 10 may comprise a synchronizer 30 which may take the form of a gas discharge tube 31 which is periodically discharged by reason of the fact that a condenser 32 is periodically charged from a source of positive voltage 33. As the condenser accumulates a positive charge to a predetermined degree, sufficient positive voltage will be placed on the plate of the gas tube 31 to cause the tube to discharge. This will generate a negative voltage which is passed through a phase inverter tube 35 whose output will therefore be a positive voltage which will be placed upon the grid of a gas discharge tube 37 to generate a pulse. Thus, each time that condenser 32 discharges, tube 37 will discharge to generate a pulse having an exponential decay characteristic. Momentary frequency is determined by the condenser 38 and coil 39. This pulse is applied to the crystal 11 to generate the wave train which passes into the work piece 12.

At the same time that the pulse is generated in the work piece, the voltage train applied to the crystal 11 is also supplied to the grid G of a tube 50 of the receiver amplifier 15. The tube 50, however, is not rendered conductive by reason of the wave train impressed on grid G because of the larger negative inhibiting voltage impressed on the suppressor grid G' by a source of negative voltage such as battery 51. At the proper time, as described hereinafter, a blocking pulse generator 60 will impress a positive voltage on grid G' sufficient to render tube 50 conductive.

This pulse generator 60 is essentially a flip-flop circuit of known design such as described for instance in "Time Bases" by O. S. Puckle, published by John Wiley, New York, 1943, p. 37. The flip-flop circuit is essentially a multi-vibrator circuit with one half normally biased to cut-off. In such circuit a tube 61 is normally conductive while a tube 62 is normally biased to cut-off and is non-conductive. There is therefore no output from tube 62 and hence no output from amplifier tube 63 into which the output of tube 62 feeds, and hence there is no positive signal impressed on the grid G' from the output of tube 63. The positive pulse generated by the tube 35 is led to the grid 66 of tube 62 from connection 67 through a time constant comprising the resistor 68 and the condenser 69. The positive signal from tube 35 would ordinarily tend to make the tube 62 immediately conductive and thus would impress a positive signal on grid G' to render the receiver effective. This, however, is not desired because if the amplifier 15 were effective at this time it would receive the entire transmitted pulse and an indication 25 would appear on the oscilloscope. Therefore, the time constant 68, 69 is so chosen that sufficient positive voltage is not impressed on grid 66 until the generated pulse has ended. Then tube 62 becomes conductive, a positive voltage is placed on suppressor grid G' and the receiver amplifier is now ready to receive signals occurring after the generated pulse has ended, in other words, from point A on toward point B.

To maintain the generator effective from the distance A to B, in spite of the fact that the generated pulse has ended, there is provided the condenser 71 and resistance 72 which are adjusted in value so that the time interval necessary to cause the grid of tube 61 to become sufficiently positive to render tube 61 conductive will be adjusted so that tube 62 remains conductive and tube 61 is non-conductive until point B is reached. At this point, tube 62 becomes non-conductive and tube 61 becomes conductive. As soon as tube 62 becomes non-conductive the positive signal is removed from suppressor grid G' of tube 50 and the amplifier 15 becomes again ineffective even though a signal is impressed on grid G by the reflection of the generated pulse from the opposite bounding surface S'. In other words, no indication 25' will appear on the oscilloscope. Thus, both indications 25 and 25' are omitted, and any indications which appear must be due to reflections from defects no matter how close to the bounding surfaces they lie since the receiver has been rendered ineffective as long as the generated pulse lasts and just before the reflection of the generated pulse from the opposite surface is received. Tube 62 remains conductive for a predetermined time (as determined by 71 and 72) after the pulse from tube 35 and thereafter becomes non-conductive. Hence the amplifier remains ineffective for the interval beginning just before the reflected pulse from surface S' is received and continuing until after the generation of the succeeding pulse has ended, in other words, from B to A in Fig. 2. As a result of this arrangement, a meter can be employed since only signals due to defects will be received. The use of the meter would be impossible if signals due to the transmitted pulse or its reflection from the rear surface were also received, since a meter cannot distinguish between these signals and those due to a defect.

The foregoing description of the invention is merely illustrative and changes may be made within the scope of the appended claims.

Having described my invention, what I claim and desire to secure by Letters Patent is:

1. In a device for inspecting material, means for generating a pulse, means for transmitting the pulse into the material and for receiving reflections, a receiver adapted to be actuated by said transmitting and receiving means, an indicator actuated by said receiver, said receiver including a tube having a grid, means for normally biasing the grid to render the receiver ineffective, and means for rendering said receiver effective, said last-named means comprising a multi-vibrator circuit having one tube normally biased to cut-off so as to be rendered non-conductive, means whereby the generation of said first-named pulse renders said tube conductive to cause the multi-vibrator to generate a pulse capable of overcoming the bias on said grid to render the receiver effective, and means for impressing said multi-vibrator pulse on said grid.

2. In a device for inspecting material, means for generating a pulse, means for transmitting the pulse into the material and for receiving reflections, a receiver adapted to be actuated by said transmitting and receiving means, an indicator actuated by said receiver, said receiver including a tube having a grid, means for normally biasing the grid to render the receiver ineffective, and means for rendering said receiver effective, said last-named means comprising a multi-vibrator circuit having one tube normally biased to cut-off so as to be rendered non-conductive, means whereby the generation of said first-named pulse renders said tube conductive to cause the multi-vibrator to generate a pulse capable of overcoming the bias on said grid to render the receiver effective, means for impressing said multi-vibrator pulse on said grid, and time constant means interposed between the first-named pulse generator and the multi-vibrator whereby said tube is maintained non-conductive until the generation of said first-named pulse ends.

3. In a device for inspecting material, means for generating a pulse, means for transmitting the pulse into the material through one surface thereof and for receiving reflections therefrom, a receiver adapted to be actuated by said transmitting and receiving means, an indicator actuated by said receiver, said receiver including a tube having a grid, means for normally biasing the grid to render the receiver ineffective, and means for rendering said receiver effective, said last-named means comprising a multi-vibrator circuit having one tube normally biased to cut-off so as to be rendered non-conductive, means whereby the generation of said first-named pulse renders said tube conductive to cause the multi-vibrator to generate a pulse capable of overcoming the bias on said grid to render the receiver effective, means for impressing said multi-vibrator pulse on said grid, time constant means interposed between the first-named pulse generator and the multi-vibrator whereby said tube is maintained non-conductive until the generation of said first-named pulse ends, and time constant means in the multi-vibrator circuit for maintaining said tube conductive until just prior to the reception of the reflection of said first-named pulse from the opposite surface of the material.

RALPH B. DE LANO, Jr.

REFERENCES CITED

The following references are of record in the file of this patent:

UNITED STATES PATENTS

| Number | Name | Date |
|---|---|---|
| 2,280,226 | Firestone | Apr. 21, 1942 |
| 2,371,988 | Granqvist | Mar. 20, 1945 |
| 2,400,796 | Watts | May 21, 1946 |
| 2,403,527 | Hershberger | July 9, 1946 |